United States Patent [19]
Kibler et al.

[11] 3,853,206
[45] Dec. 10, 1974

[54] SPOT BRAKE STRUCTURE INCLUDING A PIVOTED LEVER ACTUATOR

[75] Inventors: Robert L. Kibler; Thomas R. Dosmann, Sr., both of St. Joseph, Mich.

[73] Assignee: Lambert Brake Corporation, St. Joseph, Mich.

[22] Filed: Jan. 2, 1973

[21] Appl. No.: 320,528

[52] U.S. Cl............. 188/72.9, 192/70.24, 192/93 R
[51] Int. Cl.......................................... F16d 55/224
[58] Field of Search ....... 188/72.6, 72.9; 192/70.24, 192/93 R, 99 A

[56] References Cited
UNITED STATES PATENTS

| | | | |
|---|---|---|---|
| 3,489,251 | 1/1970 | Swift | 188/72.6 |
| 3,499,508 | 3/1970 | Swift | 188/72.9 |
| 3,698,504 | 10/1972 | Harvey | 188/72.9 |
| 3,708,041 | 1/1973 | Hahn | 188/72.9 |

FOREIGN PATENTS OR APPLICATIONS

| | | | |
|---|---|---|---|
| 883,624 | 10/1971 | Canada | 188/72.9 |

*Primary Examiner*—George E. A. Halvosa
*Attorney, Agent, or Firm*—Olson, Trexler, Wolters, Bushnell & Fosse

[57] ABSTRACT

There is disclosed a spot brake having a channel-type housing stamped from sheet metal, a shiftably supported friction member and a camming actuating lever pivotally supported by the metal housing. A pin member received in an open recess in a side of the channel-type housing cooperates with the lever to provide its pivotal support.

3 Claims, 3 Drawing Figures

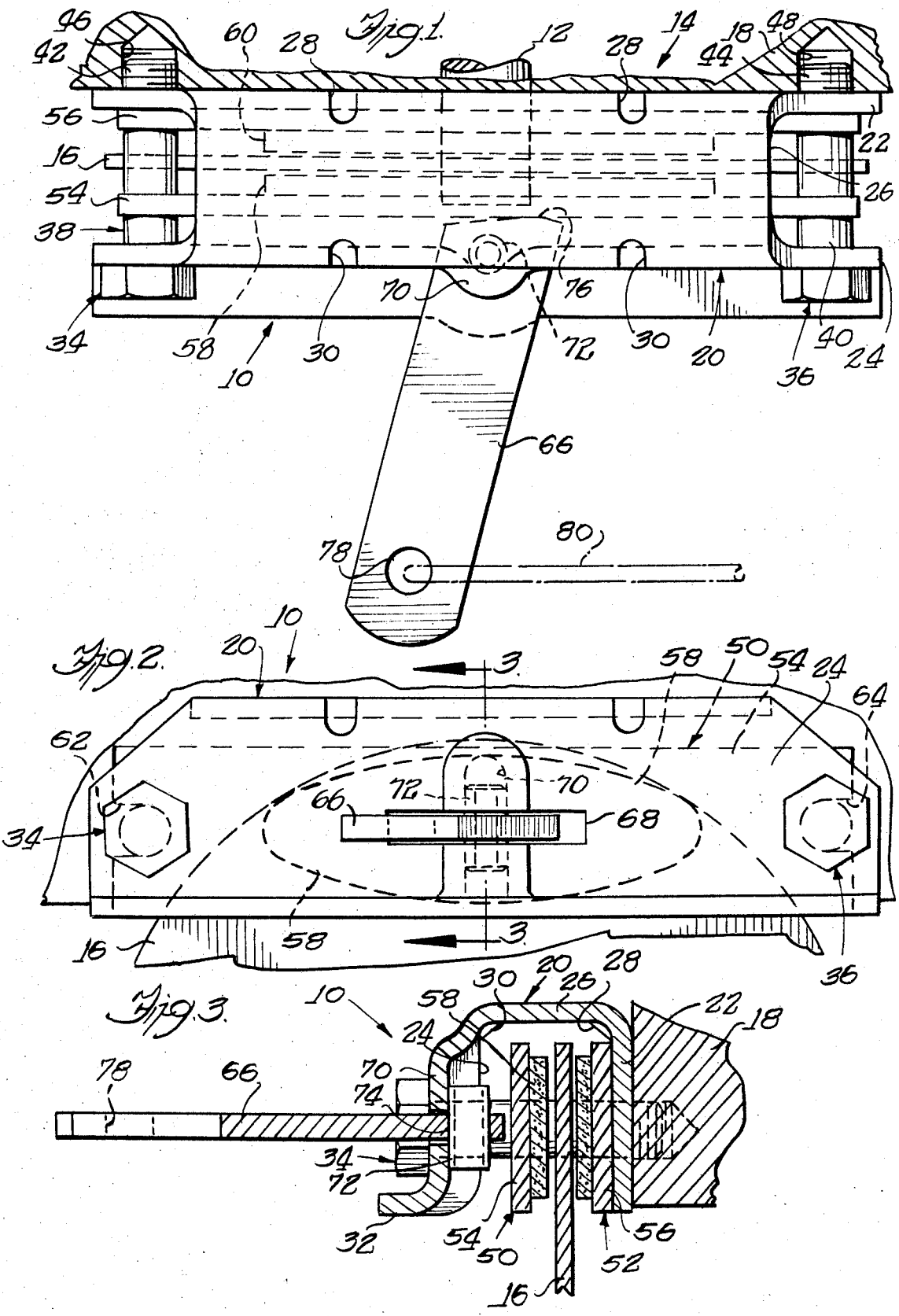

SPOT BRAKE STRUCTURE INCLUDING A PIVOTED LEVER ACTUATOR

The present invention relates to a novel brake structure, and more specifically to a novel spot brake structure.

While features of the present invention may be utilized in brakes adapted to be installed in various vehicles, the novel brake structure is especially suitable for a relatively light duty such as might be found in certain recreational vehicles, small garden tractors and riding lawn mowers. It is an object of the present invention to provide a novel brake structure especially suitable for use in such vehicles and which is efficient and effective in operation and of simple and economical construction.

A more specific object of the present invention is to provide a novel light weight spot or disc brake having a main body or frame member constructed of sheet metal formed so as to attain relatively high resistance to deflection under load whereby to enable the structure to accomodate higher breaking torques.

Another object of the present invention is to provide a novel brake structure of the above described type which is of relatively compact design for enabling it to be installed in less space.

Still another object of the invention is to provide a novel brake structure of the above described type which is readily adaptable for different methods of mounting for cooperation with either an axially fixed or axially shiftable rotor disc.

A further object of the present invention is to provide a novel spot or disc brake structure having a reduced number of separate parts so as to facilitate assembly.

Still another object of the present invention is to provide a novel brake structure of the above described type which is formed so as to protect internal friction members from foreign material such as mud, dirt and the like, whereby to enable the structure to be mounted in a vehicle at a wider variety of locations for enabling the vehicle designer increased freedom in design alternatives and also to facilitate use of the brake structure in existing vehicles.

Other objects and advantages of the present invention will become apparent from the following description and the accompanying drawings wherein:

FIG. 1 is a plan view showing a novel structure incorporating features of the present invention secured to the frame of the vehicle;

FIG. 2 is a side elevational view of the structure shown in FIG. 1; and

FIG. 3 is a partial sectional view taken along line 33 in FIG. 2.

Referring now more specifically to the drawings wherein like parts are designated by the same numerals throughout the various figures, a brake structure 10 is shown for controlling rotation of a shaft 12 of a machine 14. The machine may, as previously indicated, be a vehicle such as a tractor, a riding lawn mower and the like. It is to be understood however, that the brake may be installed in any desired machine in addition to vehicular machines having a rotatable shaft to be controlled.

In the embodiment shown, the brake structure comprises a disc or rotor 16 which is splined or keyed to the shaft 12 so as to be fixed for rotation with the shaft while at the same time being axially movable relative to the shaft during operation of the brake. The remainder of the brake structure is fixed with respect to a frame member 18 of the machine 14 as will be described in more detail below. It is contemplated however, that, in certain machines, the disc 16 may be fixed against axial movement relative to the shaft, while the remainder of the brake structure may be mounted for axial movement relative to the machine frame 18.

In accordance with the present invention, the brake structure 10 comprises a main body or channel member 20 of generally U-shaped cross sectional configuration. More specifically, the channel member, which is preferably stamped from sheet metal, is provided with opposite side sections 22 and 24, connected by a bight portion 26. Ribs 28 are formed at spaced locations so as to traverse the junction between side portion 22 and bight portion 26 and similar ribs 30 are formed between the bight portion 26, the side portion 24 for resisting bending of the metal at the corners and aiding and maintaining the side portions in substantially parallel relationship. Preferably, the side portion 24 is provided with a laterally extending reenforcing flange 32.

The channel shaped body member 20 is adapted to be positioned for embracing a peripheral segment of the disc 16 as shown best in FIg. 3. In the embodiment shown, the channel member is secured to the vehicle or machine frame 18 by bolts 34 and 36. These bolts have heads formed at their outer ends and smooth shanks 38 and 40 respectively extending through aligned apertures in end portions of sides 22 and 24. The smooth shanks terminate in threaded end sections 42 and 44 which are turned into tapped holes 36 and 48 in the frame member 18.

Stator assemblies 50 and 52 are assembled in the channel member for frictionally engaging the disc 16 during operation of the brake. The stator members respectively comprise elongated plate or carrier members 54 and 56 preferably stamped from sheet metal and elongated friction pads 58 and 60 secured to the plates. The friction pads may be formed from any suitable known friction or brake lining material.

The plate or carrier members 54 and 56 are provided with slots 62 and 64 in opposite ends thereof for receiving the smooth bolt shanks 38 and 40 extending between the opposite sides of the channel member. The dimensions of the slots are such that the carrier or plate members are slidable on the bolts whereby the smooth bolt shank not only function for securing the brake structure to the machine, but also provide guide rods for supporting and guiding the carrier plates during the operation of the brake.

In order to energize the brake, an actuating lever 66 is pivotally carried by the channel member 20. The actuating member is also preferably stamped from sheet metal and has an inner end portion projecting through a slot 68 formed in the side 24 of the channel member. The actuating lever is simply, economically and yet effectively pivotally supported with respect to the channel member. This is accomplished by embossing an elongated arcuate seat or groove 70 in the side wall 24 and through the laterally extending flange 32. The seat 70 extends generally vertically or transversly of the side wall 24 and is centrally disposed so that the axis thereof substantially traverses an extension of the axis of the shaft 12.

A roller bearing or pin 72 is driven with a force fit into an aperture 74 formed in an inner end portion of the actuating lever as shown best in FIG. 3. Since the seat 70 opens at the locals or free margin of the side portion 24 opposite from the bight portion, the parts may be readily assembled by first inserting the actuating lever 66 through the slot 68 and then forcing the pin 72 axially upwardly along the seat 70 and through the aperture 74 in the lever. As shown best in FIG. 1, the innermost end of the actuating lever 66 is formed with the cam surface 76 which engages the carrier plate 54. Thus the actuating lever is trapped with the pin 72 properly disposed in the seat 70.

Any suitable means may be provided for manipulating the actuating lever 66 for energizing the brake. In the embodiment shown, the actuating lever has means in the form of an aperture 78 adjacent its outer ends for connection with a link or cable 80 through which a force may be applied to the lever for energizing the brake. It will be observed, that when the actuating element 80 is pulled toward the right as viewed in FIG. 1, the lever 68 will be pivoted about the bearing or pin 72 in a counter clock-wise direction and this action causes the cam surfaces 76 to slide the friction assembly 50 along the rods or bolts 38 and 40 until the friction disc 16 is clamped between the friction pads 58 and 60 for effecting the braking operation. The braking torque is transmitted through the stator assembly and bolts to the channel member. The U-shaped cross-section and the connecting bight portion between the sides 22 and 24 enable the sheet metal member to absorb relatively high torque loads without undue distortion. Furthermore, the channel configuration provides an effective housing which encloses the friction pads sufficiently to protect them from dirt and other foreign material.

While a preferred embodiment of the present invention has been shown and described herein, it is obvious that many structural details may be changed without departing from the spirit and scope of the appended claims.

The invention is claimed as follows:

1. A brake structure cooperable with a rotor disc to be controlled comprising an elongated sheet metal channel member of generally U-shaped cross-sectional configuration and including first and second opposite, generally parallel side portions for embracing opposite sides of the rotor disc and a connecting substantially closed bight portion extending between longitudinal outer margins of said side portions for overlying a peripheral section of the rotor disc, said first side portion including a free margin opposite from said bight portion and a generally centrally located opening therethrough between the bight portion and said free margin, stator means movably mounted within said channel member and carrying friction pad means substantially enclosed by said bight portion and said side portions for protection from foreign material, an actuating lever having an inner end portion extending through said opening and engageable with said stator means for energizing the brake upon actuation of the lever, said first side portion comprising an outwardly embossed seat portion providing an inwardly open groove extending transversely of said first side portion, across said opening and with an access opening through said free margin, and an elongated pin bearing element insertable into said groove through the access opening from a position outwardly of said free margin and by force fit through an aperture in the inner end portion of the actuating lever for pivotally connecting the lever with said first side portion with the pin bearing element confined to the groove during movement of the lever.

2. A brake structure, as defined in claim 1, wherein said lever comprises a substantially flat bar, and said opening in the first side portion comprises narrow slot means pivotally confining said bar.

3. A brake structure, as defined in claim 1, wherein said sheet material member comprises a plurality of embossed ribs traversing junctions between the bight portion and the side portions at spaced locations, said first side portion free margin terminating in a laterally outwardly projecting flange portion.

* * * * *